(No Model.) 6 Sheets—Sheet 1.
W. R. STEINER.
CORN HARVESTER.
No. 505,492. Patented Sept. 26, 1893.
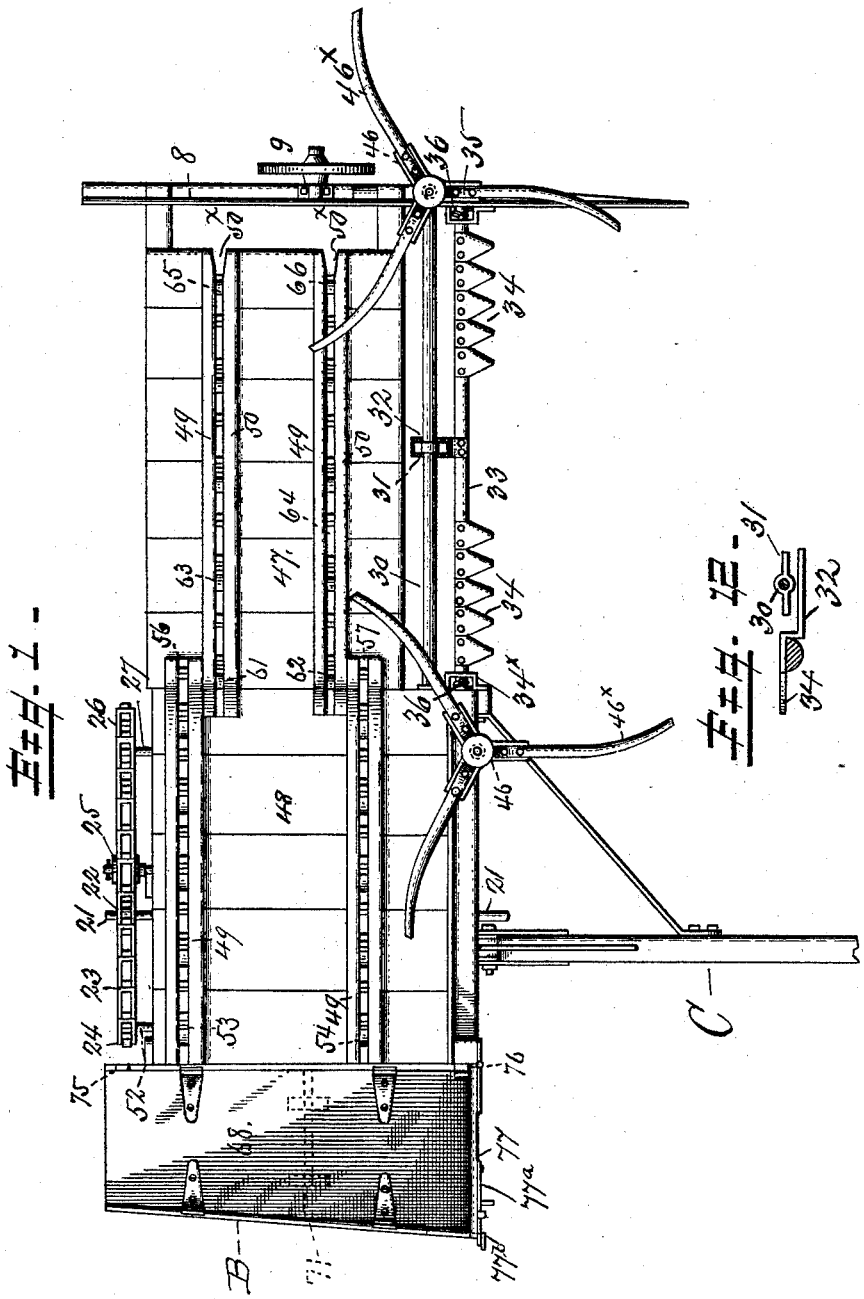
Witnesses
Wm. H. Bates
F. O. McCeary
Inventor
Wm. R. Steiner
by A. G. Heyfman
Attorney

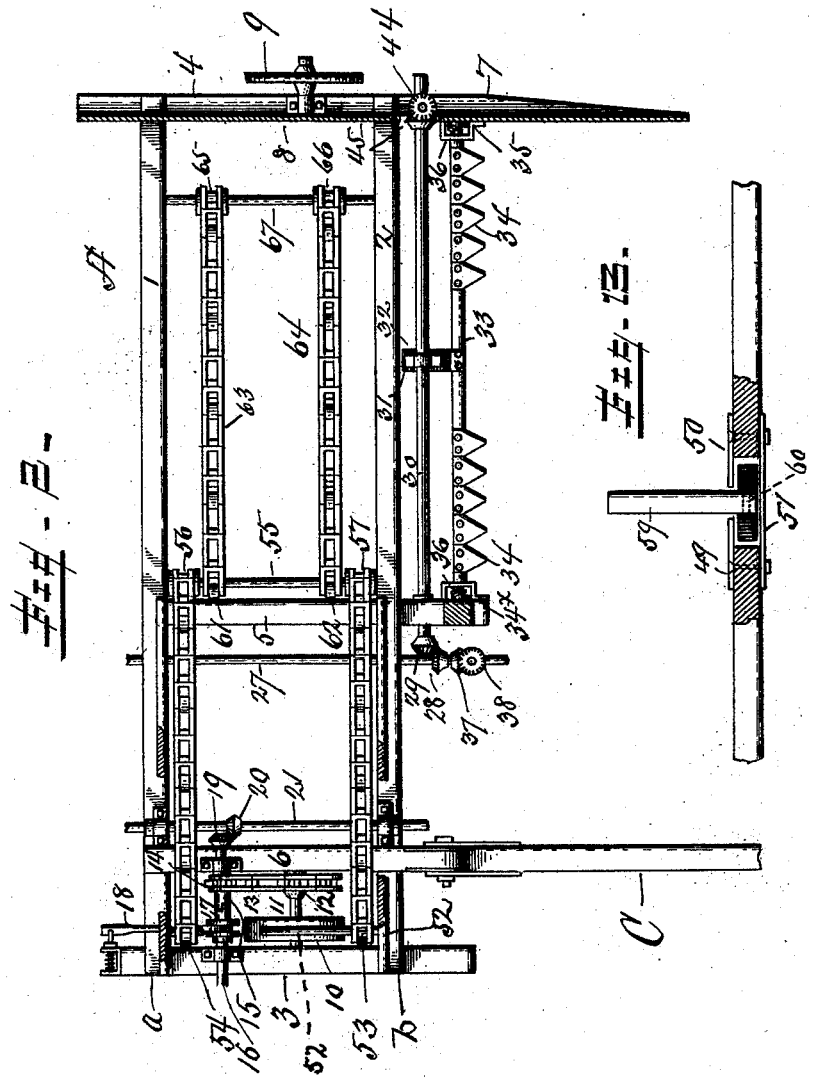

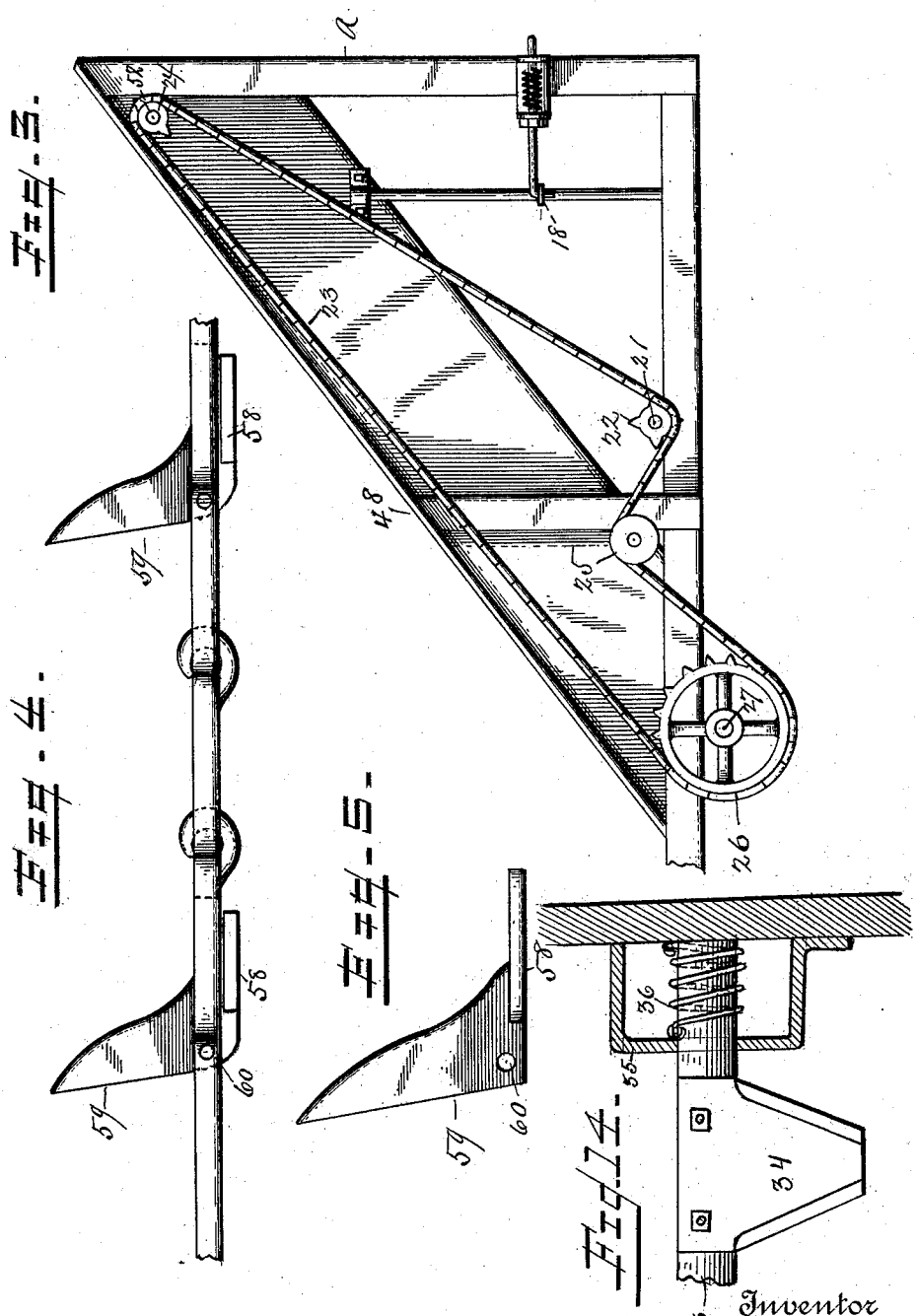

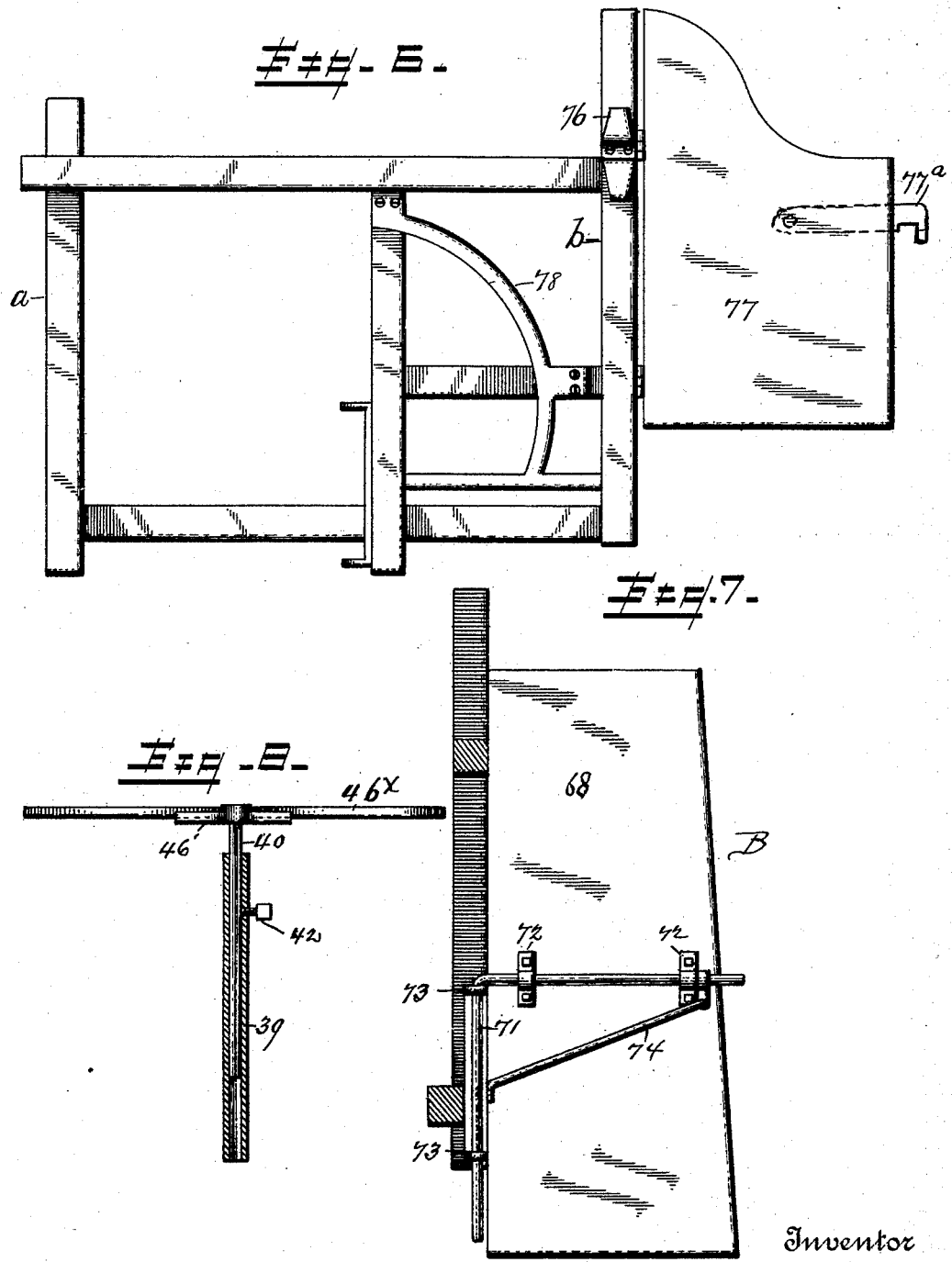

(No Model.) 6 Sheets—Sheet 5.
W. R. STEINER.
CORN HARVESTER.
No. 505,492. Patented Sept. 26, 1893.
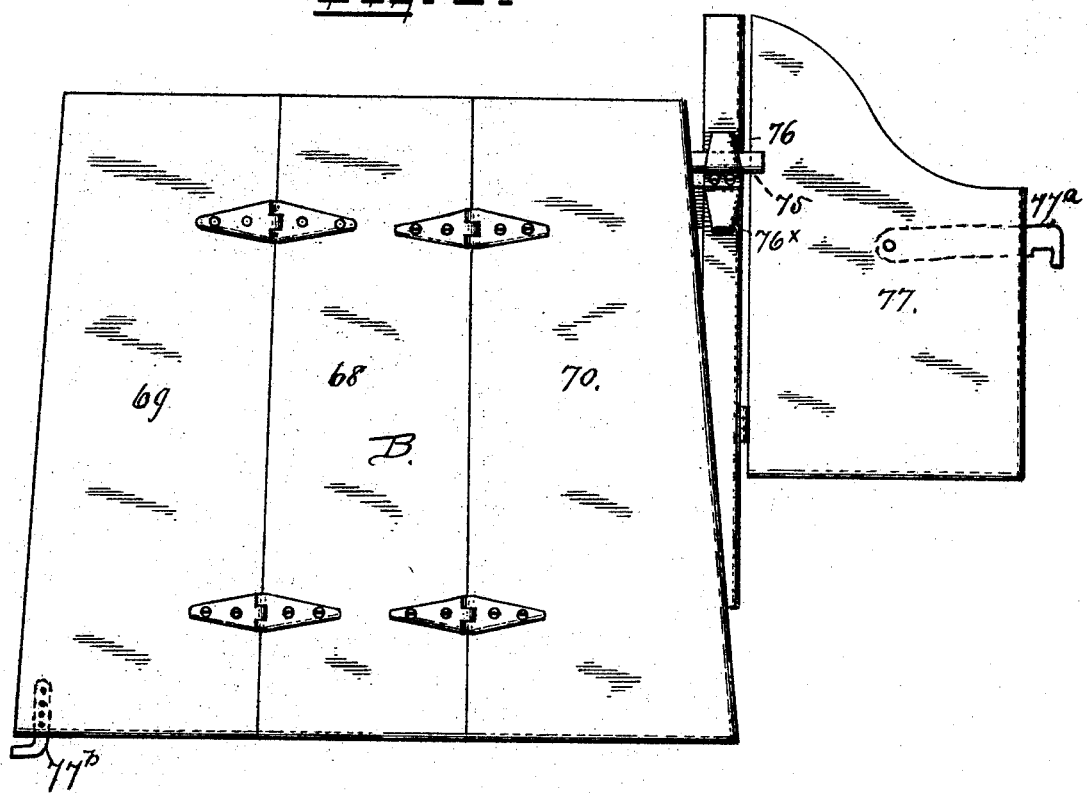
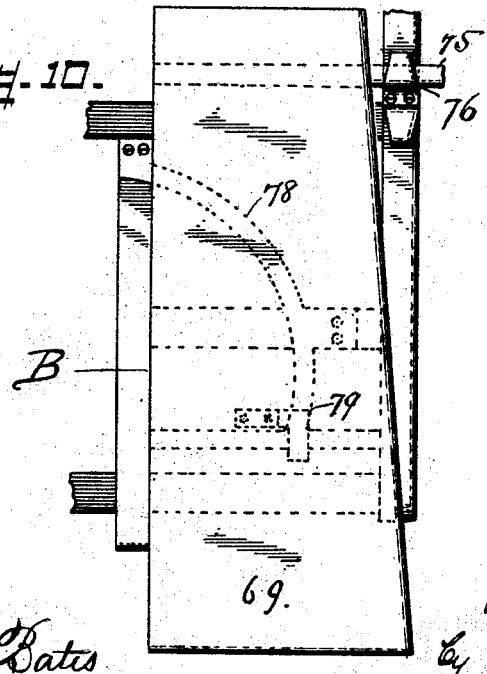
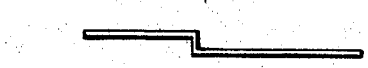
Witnesses
Inventor
Wm. R. Steiner
by A. G. _____
Attorney (No Model.) 6 Sheets—Sheet 6.
W. R. STEINER.
CORN HARVESTER.
No. 505,492. Patented Sept. 26, 1893.
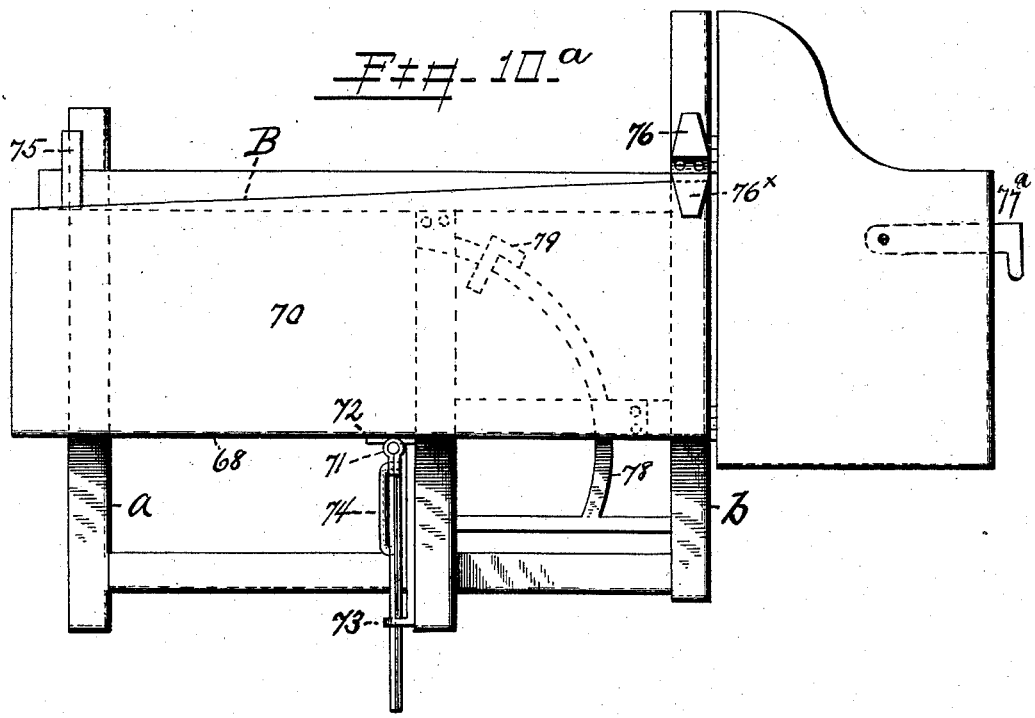
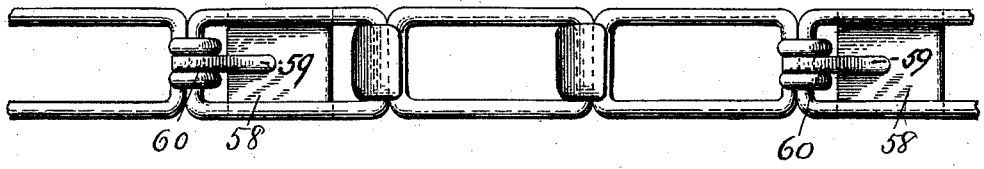
Witnesses
Albert B. Blackwood
A. A. Hosmer
Inventor
Wm. R. Steiner
by A. G. Kuhlman
Attorney

UNITED STATES PATENT OFFICE.

WILLIAM R. STEINER, OF FREDERICK, MARYLAND.

CORN-HARVESTER.

SPECIFICATION forming part of Letters Patent No. 505,492, dated September 26, 1893.

Application filed September 18, 1891. Serial No. 406,138. (No model.)

*To all whom it may concern:*

Be it known that I, WILLIAM R. STEINER, a citizen of the United States of America, residing at Frederick, in the county of Frederick and State of Maryland, have invented a new and useful Corn-Harvester, of which the following is a specification.

My invention relates to improvements in corn-harvesters of that class or construction wherein the standing corn is cut and directed on a carrying means and moved thereby into a bundling or shocking box in condition to be secured into a bundle or shock; and the object is to simplify and improve existing mechanisms of the kind to which the present invention is allied.

My invention consists in the novel construction of parts and their combination as will be hereinafter fully specified and as particularly pointed out and distinguished in the claims.

I accomplish the purposes and objects of my invention by the means or mechanisms illustrated in the accompanying drawings, wherein—

Figure 1, is a plan view of the entire machine. Fig. 2, is a plan view with the receiving floor and floor of the elevator removed, showing the gearing and the carrying-chains. Fig. 3 is a side view in elevation of the arrangement of the driving chains, and showing the inclination of the elevator floor. Fig. 4, is a detail view of a portion of one of the carrying chains, showing the construction of the lugs on the chain. Fig. 5, is a detail of one of the carrying-lugs of the chain. Fig. 5ª is a plan view of the carrying chain. Fig. 6, is a view of the frame at the side of the machine showing the support and guide of the bundle or shock box, and also showing the end door of the bundle or shock box swung open. Fig. 7, is a bottom view of the bundle or shock box, turned upright on its support. Fig. 8, is a view of the extensible reel-support. Fig. 9, is a view of the bundling-box as open and standing flat against the side of the machine, and with the end-door of the box swung open. Fig. 10, is a side view of the bundling-box in upright position with the latch-bar lodged in its keeper; and the guide-bar shown in dotted lines. Fig. 10ª is a view in elevation of the machine showing the shock-box in horizontal position. Fig. 11, is a side view of the keeper on the side of the bundling-box which engages the guide-bar. Fig. 12, is a detail view of the means for throwing the cutters upward. Fig. 13, is a transverse section of the ways in the floors of the machine. Fig. 14 is a detail view showing the arrangement of one of the springs on the oscillating cutter-bar.

A, designates the frame of the machine, consisting of substantial rails 1, 2, connected at their ends by end-pieces 3, 4, and having an intermediate cross-piece 5; and also having a cross-piece 6, which together with the end-piece 3, constitute a foundation for the driving mechanism. The end-piece 4, is extended well beyond the rail 2, as seen at 7, and has secured edgewise thereon the end-board 8, constituting means to keep the cut stalks from falling off the receiving floor of the machine, and as a guide to the row of stalks; the cross-piece 5, is also extended beyond the frame, as shown, and on these extensions adjacent to the main frame are mounted the shaft which drives the outer reel, and the cutter-shaft, as will be hereinafter more fully described.

The frame is supported and carried on an end-wheel 9, having its axle fixed on the end-piece 4, and at the other end of the frame is journaled the driving-wheel 10.

On the shaft 11, of the driving-wheel is mounted a sprocket wheel 12, about which is a chain 13, arranged on a smaller sprocket-wheel 14, mounted on a hub or sleeve 15, loose on the shaft 16, journaled on the frame substantially as shown in Fig. 2, of the drawings.

On the shaft 16, is a coupling sleeve 17, splined on the shaft, and automatically operated by a spring actuated lever 18, the force of the spring being such as to move the lever so that the coupling is normally held in connection with the sleeve of the wheel 14, when the machine is moving forward, and when the machine is backed, the wheel 14 may turn loose on the axle, and the mechanism connected therewith remain idle. The shaft 16 is extended inward and has fixed thereon a small bevel gear-wheel 19, which meshes with a similar gear-wheel 20, on a shaft 21, journaled across the frame, and carrying on its extended rear end a sprocket wheel 22, which engages with a chain 23, and by this engagement imparts through the instrumentality of the chain, motion to the several operative elements of the machine. The chain 23, is carried at its upper end (see Figs. 1 and 3) on a sprocket wheel 24, on the upper shaft of the inclined carriers, thence is carried down and engaged by the driving-sprocket 22, thence over an idler 25, on the frame, and thence over a larger sprocket wheel 26, at the lower portion, as seen in Fig. 3, of the drawings. The sprocket wheel 26, is carried by a shaft 27, journaled on the frame of the machine, and having mounted thereon a bevel gear wheel 28, which meshes with a similar gear-wheel 29, on the end of a shaft 30, journaled lengthwise of the frame.

In the middle portion of the shaft 30, is secured a double ended tappet or knocker 31, which engages an arm 32, on the cutter-bar 33, having secured thereon the cutters 34, arranged to engage and cut the rows of corn in the progress of the machine. The bar 33, is held in bearings $34^x$, 35, at its ends; the bearings being formed to have the ends of the bar project therein, as seen in Fig. 1, of the drawings, and on these ends are arranged torsional springs 36, the force of which is to maintain the knives substantially at a horizontal position and to return them to normal position after having been moved by the action of the tappet. In order to give the cutters a shearing movement, I have provided the cutter-bar with the arm 32, which as stated, is engaged by the tappet 31, as the shaft 30, rotates, and thus bears down the arm and moves the cutters in an upward direction, which cuts the stalks with a shear or slant.

On the shaft 27, is a bevel-gear wheel 37, which meshes with a similar gear 38, at the bottom of a vertical hollow spindle (see Fig. 8) 39, in the bore of which, the stem 40, of one of the reels $46^x$ is adjustably held by means of a set-screw 42. The outer reel is of the same construction and is supported in a hollow spindle similar in construction to the spindle 39, and carrying a bevel-wheel 44, at its lower end which meshes with a bevel gear-wheel 45, on the shaft 30. The stem of the reels carries a spider 46, in the arms of which are secured the curved arms $46^x$ of the reel. The reels are arranged to direct the standing corn toward the cutters and onto the floor of the machine, substantially as indicated in Fig. 1, of the drawings.

The floors 47, 48, of the machine are stationary, and formed with slots or ways 49, extending the entire length thereof, through which slots the lugs of the carrying-chains project and engage the stalks as they lie on the floors. The rear ends of the ways may be flared or widened as at $50^x$ to permit the free progression of the lugs at the turn, and to accommodate any slight variation at this point. The floor 47, is level, while the floor 48, is at an upward incline from bottom to top as shown in Fig. 3, of the drawings.

The frame which supports the inclined floor of the machine, consists of oppositely arranged vertical standards $a$, $b$.

On the floors adjacent to the ways are secured metal strips 49, 50, extending over the edges of the boards, and under the space between the boards is secured a metal strip 51, which constitutes a bottom for the way and prevents the chains from being interfered with from below the floors.

On the standards $a\ b$, in suitable bearings, is journaled a shaft 52, which carries the sprocket-wheel 24, driven by the chain 23.

On the shaft 52, are fixed two sprocket wheels 53, 54, and at the bottom of the incline is journaled a shaft 55, carrying flanged wheels 56, 57; and on these sprocket wheels and flanged wheels are arranged the carrying chains of the inclined floor, substantially as seen in Fig. 2, of the drawings. These carrying chains are provided with lugs consisting of a bottom-piece 58, and the lug 59, the bottom-piece being wider than the lug so that the sides or flanges may move in the groove of the ways in the floors. The lugs are pivotally held on the links by means of a hole 60, at the lower front portions, as shown in Figs. 4 and 5. The flanges or edges of the bottom-pieces of the lugs 59 engage under the links of the chain to which they are connected, as shown in the drawings, and the lugs are thus held in direction to carry the stalks over and up the floors as the chains travel through the guide-ways.

On the shaft 55, are fixed two sprocket-wheels 61, 62, carrying the chains 63, 64, of the lower floor, which chains are arranged at the other end on flanged wheels 65, 66, on a shaft 67, and travel in the ways of the floor with the lugs projecting above the floor to engage the fodder which may be thrown thereon.

B, designates the shock box. This consists of a bottom-piece 68, and two side-pieces 69, 70, hinged together, as seen in Fig. 9, of the drawings, the bottom being supported to tilt or turn on an arm of a bar 71, held in keepers 72, on the bottom of the box; the other arm of the bar being bent at right angles, and held to turn in bearings 73, on the frame of the machine, as seen in Fig. 7, of the drawings. The box B is supported on its bearing so that the rear end overbalances the front portion, and is held in horizontal position by the engagement of the side under a keeper $76^x$ as shown in Fig. $10^a$ of the drawings; it is also braced by a rod 74, having a hook on its outer end to engage an eye on the rod or bar 71, as shown in the drawings, and when turned into vertical position to permit the discharge of the cut stalks, as seen in Fig. 10, a latch bar 75 on the side of the box engages a keeper 76 and prevents the box from turning further.

A door 77, hinged to the frame closes the end of the shock box, when the box is in position to receive the cut stalks. On the door 77 is a latch $77^a$, the end of which engages in a catch $77^b$, on the end of the outer side piece 69 of the shock-box, to hold the side vertical when the box is in position to receive the cut stalks, as indicated in Fig. 1 of the drawings.

To guide the box in the operation of being tilted, and to aid in holding it in such position I fix a curved bar 78, on the frame, and on the inner leaf or side of the box fasten a guide or keeper 79 which engages the bar 78, and which when the box is tilted, follows the curve and keeps the box from moving out of line in its support. When the box is tilted and the shock is sitting in upright position the bottom can be swung back on the crane or bar and hinges which support it, and the outer leaf or side of the box swung on its hinges, and the box assumes a flat surface as seen in Fig. 9, of the drawings, in which position the machine can be moved forward without disturbing the shock, or knocking it down.

The machine is provided with a tongue C, by which it is drawn.

The operation of the machine, and the manipulation of the cut corn are as follows: The machine moving forward the rows or stalks of the corn are engaged by the reels, and directed to the action of the cutters and being severed, fall on the receiving floor of the machine, where the lugs of the chains carry them in the direction of the inclined floor when they are engaged by the lugs of the chains therein, and carried up the incline over the end, dropping into the shock box. When a sufficient quantity of stalks has been deposited in the shock box to make a shock, the machine is stopped and the shock tied while in the box. Now, to discharge the shock from the box the end door is unlatched and swung open, as shown in Fig. 9, and the box then tilted into an upright position, as shown in Figs. 7 and 10, by the attendant which throws the shock in upright position on the butts. The bar 74 is then unhooked which leaves the bottom free to be swung around and the side to be turned out, and then the box is in the flat position seen in Fig. 9. The machine can now be moved past the shock, after which the box can be righted, assembled and secured, and the cutting resumed.

Having thus described my invention, explained its principle, and clearly defined its parts, as required by the statute, what I claim as my invention, and desire to secure by Letters Patent, is—

1. In a corn-harvester the combination, with the receiving-floor of the machine, of a revolving shaft mounted parallel with said floor and provided with a tappet, a cutter-bar mounted parallel to the said revolving shaft and journaled to rock in its bearings, cutters projecting horizontally from and rigidly secured to the rocking-cutter-bar, a torsional spring on the cutter-bar to return it to normal position and restrain it from rotation, an arm on the cutter bar arranged to be engaged by the tappet, and means to rotate the tappet shaft, substantially as described.

2. In a corn-harvester the combination, with a stalk delivering mechanism, of a shock-box B composed of a bottom-piece and two side-pieces hinged together, and a support projected from the machine through bearings on the bottom of the box and arranged to swing in a horizontal plane, whereby the box may be turned on its bearings into an upright position and swing on the support and lie open, substantially as specified.

3. In a corn-harvester the combination, with the frame of the machine, of the end-door hinged to the frame, the shock-box B, composed of the bottom-piece and side-pieces hinged together and the supporting-bar 71 held in keepers 72 on the bottom of the box and to turn in bearings 73 on the frame, all substantially as and for the purpose specified.

4. In a corn-harvester the combination, with the frame of the machine, of the shock-box B composed of a bottom-piece and two side-pieces hinged thereto, and the supporting bar 71 held in keepers 72 on the bottom of the box and to turn in bearings 73 on the frame, as set forth.

In witness whereof I have hereto set my hand in the presence of two attesting witnesses.

WILLIAM R. STEINER.

Attest:
F. O. McCLEARY,
WILLIAM PAXTON.